United States Patent [19]

Gajewski et al.

[11] Patent Number: 5,654,390

[45] Date of Patent: Aug. 5, 1997

[54] TRIMODAL MOLECULAR WEIGHT POLYETHER POLYOL PREPOLYMERS

[75] Inventors: Vincent John Gajewski, Cheshire, Conn.; Christopher James Maupin, Aurora, Ill.

[73] Assignee: Uniroyal Chemical Company, Inc., Middlebury, Conn.

[21] Appl. No.: 561,650

[22] Filed: Nov. 17, 1995

[51] Int. Cl.⁶ .................................................. C08G 18/48
[52] U.S. Cl. .......................... 528/63; 252/182.22; 528/64; 528/76
[58] Field of Search ....................... 252/182.22; 528/63, 528/64

[56] References Cited

U.S. PATENT DOCUMENTS

| | | | |
|---|---|---|---|
| 1,101,410 | 1/1914 | Cyanamid . | |
| 3,798,200 | 3/1974 | Kaneko | 260/77.5 |
| 3,963,681 | 6/1976 | Kaneko | 260/77.5 |
| 3,980,606 | 9/1976 | Werner | 260/31.8 |
| 4,182,825 | 1/1980 | Jackle | 528/44 |
| 4,786,703 | 11/1988 | Starner | 528/63 |
| 4,934,425 | 6/1990 | Gajewski et al. | 152/323 |
| 5,223,599 | 6/1993 | Gajewski et al. | 528/59 |

*Primary Examiner*—Rachel Gorr
*Attorney, Agent, or Firm*—Raymond D. Thompson

[57] ABSTRACT

A trimodal molecular weight toluene diisocyanate end-capped polyether polyol prepolymer is disclosed having free toluene diisocyanate below 0.5 weight percent where the three molecular weight polyols used are 300–800, 800 to 1500 and 1500–10000. Processes to make and use these prepolymers as polyurethane castable elastomers having exceptionally long flex fatigue lives using environmentally friendly materials essentially free of TDI are also disclosed.

10 Claims, No Drawings

TRIMODAL MOLECULAR WEIGHT POLYETHER POLYOL PREPOLYMERS

FIELD OF THE INVENTION

This invention relates to curing polyurethane elastomers with certain curatives reacted with prepolymers of polyether polyols reacted with multifunctional isocyanate. In particular, a urethane made of polyether polyols having three distinctly different molecular weights and prepared from a prepolymer having a reduced free toluene diisocyanate monomer content which are used to make the urethane elastomer. The urethanes of this invention have particular use in the manufacture of urethane products requiring very high flex fatigue resistance such as belts, automotive and industrial products and non-pneumatic tires.

BACKGROUND OF THE INVENTION

Urethanes have been used in the manufacture of solid tires useful for such applications as industrial tires, off-the-road tires, bicycles tires and the like. They have not been entirely satisfactory in such applications because such urethane solid tires do not have the proper cushioning and handling characteristics for a soft vehicle ride on such applications as passenger vehicles. Also, such solid tires suffer from internal heat build-up and subsequent degradation of the elastomer material in prolonged high speed service conditions or under rough terrain situations where the tire is being deformed.

Various polyurethane elastomers have been proposed for use on such solid tires, as described in U.S. Pat. No. 4,934,425, owned by the same assignee, in which there is provided a non-pneumatic tire rotatable about an axis, having improved hysteresis and flex fatigue resistance.

The invention described above and taught in U.S. Pat. No. 4,934,425 was based on the use of a polyether polyol prepolymer having a terminal functional group containing active hydrogen capable of reacting with an isocyanate group. For commercial application, prepolymers using toluene diisocyanate are manufactured. These prepolymers have come into recent disfavor from an environmental and safety standpoint, because TDI is volatile and thus requires special handling procedures. Another drawback to the use of TDI is that free TDI remains in the prepolymer and unless extracted, it is too reactive for use with many common chain extenders except those with very low reactivities.

Attempts to use lower levels of TDI yet maintain the high flex fatigue resistance properties have to date been unsuccessful. Prepolymers prepared according to the teachings of G.B. 1,101,410 wherein the TDI monomer content has been reduced to less than 0.5% have greatly reduced flex fatigue properties. Such materials would not have the flex fatigue properties useful in non-pneumatic tire and other dynamic flex applications. When using the teachings of U.S. Pat. No. 4,934,425 and reducing the TDI content below 0.5%, again greatly reduced flex fatigue properties result.

It is a further object of this invention to provide a urethane elastomer with flex fatigue properties equal to or better than those obtained when the prepolymer is formed by reacting binary polyols with a traditional isocyanate, with a corresponding level of free isocyanate.

It is a still further object of this invention to insure that the urethane so cured will be suitable for use in a non-pneumatic tire.

This invention surprisingly demonstrates the criticality of utilizing a specialized trimodal molecular weight urethane prepared from a prepolymer having a reduced free TDI monomer content with three distinct molecular weight peaks. These peaks and low residual isocyanate are both necessary to achieve high flex fatigue resistance. The prepolymer is cured preferably with an organic diamine curative to yield a polyurethane elastomer providing the balance in properties required for good vehicle ride characteristics as well as long life.

SUMMARY OF THE INVENTION

This invention provides a trimodal MW prepolymer having residual free toluene diisocyanate below 0.5%, the prepolymer comprising a first isocyanate end capped low molecular weight polyether polyol having a molecular weight of above about 300 and below 800 and a second intermediate molecular weight isocyanate end capped polyether polyol having a molecular weight above 800 and below 1,500 and a third high molecular weight isocyanate end capped polyether polyol having a molecular weight between 1,500 and 10,000. These specialized prepolymers can then be cured or chain extended with an aromatic diamine curative to form a urethane elastomer composition. Polyurethane articles of manufacture, made preferably via castable urethane technology, are the intended primary utility of these described prepolymers and cured elastomers. These articles have a body made of the elastomer of this invention and may take the form of any article conventionally made of polyurethane or other elastomers or rubbers.

It will be shown from the following examples that when using the trimodal molecular weight prepolymers produced by the teachings of this invention, the dual advantages of low free TDI and superior flex fatigue properties result. These advantages are significant due to the higher quality, better performing product and the decreased pollution, minimal worker exposure to reactive compositions, and environmental advantages.

DETAILED DESCRIPTION OF THE INVENTION

The invention resides in the specific selection of a polyether polyol prepolymer for the urethane elastomer which has at least three distinct molecular weight polyols having a reduced free TDI monomer content which may be further chain extended (cured) to form a polyurethane elastomer with exceptional flex fatigue life.

The polyether used in this invention is a polyether having a terminal functional group containing active hydrogen capable of reacting with an isocyanate group. The functional group is selected from the group consisting of hydroxyl group, mercapto group, amino group and carboxyl group.

Moreover, a pre-extended polymer obtained by reaction between a low molecular weight polymer and a diisocyanate or a product obtained by reaction between prepolymer and diol compound may be used in this invention.

Polyethers used in this invention are an alkylene glycol such as polyethylene glycol, polypropylene glycol, polytetramethylene ether glycol and the like, polyalkylene triol such as polypropylene triol and the like, polyalkylene dicarboxylic acid, polyalkylene dithiol, polyalkylene diamine and their pre-extended polymer, and preferably polyalkylene glycol, and more preferably polytetramethylene ether glycol and its pre-extended polymer.

In this invention, a mixture of three or more different kinds of polyethers having molecular weights which are different from each other must be used. In this case, it is essential that at least one peak is located at the lower molecular weight region (from about 300 to below 800), at least one peak is located in the intermediate molecular weight region (from 800 to 1500), and at least one peak is located in the higher molecular weight region (from above 1500 to about 10,000).

Polytetramethylene ether glycol (PTMEG) is the most preferred polyol of the invention. A first low molecular weight polyether glycol is utilized having a molecular weight of above about 300 and below 800. The essential second intermediate molecular weight polyether glycol has a molecular weight above 800 and below 1500 and a third higher molecular weight polyether glycol has a molecular weight between 1,500 and 5,000.

A more preferred range for the low molecular weight material is from between 400 and 700. For the intermediate molecular weight second glycol a more preferred molecular weight range is from about 900 to about 1100. For the higher molecular weight third glycol, more preferred is below 2,000 to about 4,500.

The most preferred range is a low molecular weight glycol of about 650 molecular weight, an intermediate molecular weight glycol of about 1000 molecular weight and a higher molecular weight glycol of about 2,000. The molar percent of the first glycol (that of low molecular weight) may be from 5 to 50. The molar percent of the second (that of intermediate weight) may be from 10 to 90. The molar percent of the third (that of higher weight) may be from 5 to 50.

The more preferred molar percents for the low, intermediate, and high molecular weight glycols are from 20 to 50 for the low, 30 to 70 for the intermediate, and 5 to 20 for the high molecular weight glycols.

Still more preferred molar percents for the low, intermediate, and high molecular weight glycols are from 30 to 45 for the low, 50 to 60 for the intermediate, and 5 to 15 for the high molecular weight glycols.

The prepolymer for use in a tire or other article is formed by reacting the low, intermediate, and high molecular weight glycols set forth above with a multifunctional isocyanate. The more preferred are the toluene diisocyanates (TDI). The two most preferred materials are the 80/20 and 65/35 blend of the 2,4- and 2,6-toluene diisocyanate isomers. The ratio of TDI to polyol is commonly expressed in the art as isocyanate to polyol ratio or simply NCO:OH ratio.

The isocyanate to polyol ratio may be in the range of 1.9:1.0 to 2.8:1.0. A more preferred ratio is 2.0:1.0 to 2.6:1.0. The most preferred ratio is from 2.1:1.0 to 2.5:1.0. The percentage of free NCO in the resulting prepolymer is also in common use for characterizing prepolymers.

Polyfunctional isocyanates used in this invention are not particularly limited, but are preferably aromatic and aliphatic diisocyanates and triisocyanates. Aromatic diisocyanates are, for example:
tolylene-2,4-diisocyanate;
tolylene-2,6-diisocyanate;
naphthalene- 1,5-diisocyanate;
diphenyl-4,4'-diisocyanate;
diphenylmethane-4,4'-diisocyanate;
dibenzyl-4,4'-diisocyanate;
stilbene-4,4'-diisocyanate;
benzophenone-4,4'-diisocyanate;
and their derivatives substituted with alkyl alkoxy, halogen or nitro groups, e.g., 3,3'-dimethylphenyl-4,4'diisocyanate or 3,3'-dichlorodiphenylmethane diisocyanate, their mixtures and the like, aliphatic diisocyanates, and triisoyanates.

Among them, there may be preferably used: tolylene-2,4-diisocyanate; tolylene-2,6-diisocyanate; naphthalene-1,5-diisocyanate;diphenyl-4,4'-diisocyanate; diphenylmethane-4,4'-diisocyanate; 1,6-hexamethylene diisocyanate; 1,3 and 1,4-cyclohexyl diisocyanate; methylenebis(4-cyclohexyldiisocyanate); 1,3- and 1,4-xylene diisocyanate and their mixtures.

The diisocyanate/polyol prepolymer, once reacted must be stripped to remove unreacted TDI or other volatile isocyanates as described above. Many methods of removing unreacted TDI monomer have been documented. Included in the literature are the use of molecular sieves, solvent extraction, and vacuum distillation, most notably thin film evaporation as described in G.B. 1,101,410. When considering a method for removal of free TDI, the occurrence of undesired side reactions which may occur at high temperatures should be considered.

The prepolymers of this invention may also be blends of three separately prepared isocyanate endcapped polyol prepolymers which have had the free isocyanate removed prior to blending or subsequent to the blending step. The term "molecular weight" when used herein shall refer to number average molecular weight. The three separate prepolymers would have the molecular weight ranges indicated above, i.e. the first low molecular weight isocyanate endcapped polyether glycol made from the reaction of an isocyanate with a polyol having a molecular weight of above about 300 and below 800 (i.e. glycol with TDI). The essential second intermediate molecular weight isocyanate endcapped polyether glycol made from the reaction of an isocyanate with a polyol (i.e. glycol with TDI) having a molecular weight of between 800 and 1500 and a third higher molecular weight isocyanate endcapped polyether glycol made from the reaction of an isocyanate with a polyol (i.e. glycol with TDI) having a molecular weight between 1,500 and 10,000. Regardless of how the trimodal molecular weight prepolymers are produced they must be chain extended or cured to provide useful polyurethane/urea elastomers.

The curing agents of this invention may be aromatic or aliphatic polyamines or polyols as are conventionally used for the purpose. Aromatic diamines are, for example, 4,4'methylene bis(2-chloroaniline), 2,2',5-trichloro-4,4'-methylenediamines, napthalene-1,5-diamine, ortho, meta, paraphenylenediamine, tolylene-2,4-diamine, dichlorobenzidine, diphenylether-4,4'-diamine, their derivatives and mixtures.

Among them there are preferably employed 4,4'methylene bis 2-chloroaniline, methylene dianiline, trimethyl bis(p-amino benzoate), bis amino phenylthioethane, napthalene-1,5-diamine, dichlorobenzidine, diphenylether, 4,4'-diamine, hydrazine, ethylenediamine, hexamethylene-1,6-diamine, piperazine, ethylene glycol, 1,3-propylene glycol, 1,3 and 1,4-butane diol, trimethylpropane and their mixtures.

The final urethane elastomer is cured using aromatic organic diamines which are well-known and commercially available. The more preferred material is 4,4'-methylene bis(2-chloroaniline) which will sometimes be referred to by its common names MOCA or MBOCA. Also preferred is the diethyl toluene diamine (DETDA) which is available commercially from Ethyl Corporation under the trade name Ethacure 100. A suitable material which has a different cure rate is methylenedianiline-NaCl complex, commercially available from Uniroyal Chemical Company, Inc. as Caytur. The most preferred curative is 4,4'-methylene bis(2-chloroaniline).

The stoichiometry of the prepolymer to curative is expressed on a molar equivalence basis, hereinafter called equivalence ratio, rather than on a weight basis. The broadest practical equivalence ratio of TDI-based prepolymer to curative is about 80 to about 115. More preferred is about 95 to about 110. Most preferred is about 100 to about 105. The equivalence ratio is also commonly called—percent of theory—or simply stoichiometry.

It has been found through a long process of experimentation that several dynamic properties of elastomers must be carefully evaluated together in order to produce an elastomer suitable for the annular elastomeric body of the tire of this invention. A measure of dynamic modulus must reveal that the chosen elastomeric material has a relatively constant dynamic modulus over a wide temperature range. The tendency of the elastomer to build up internal heat due to elastic inefficiency is commonly called hysteresis in the industry. The hysteresis is commonly expressed in terms of a value obtained from a hysteresis-type test which is commonly described as tangent delta or, more commonly, tan $\delta$. The tan $\delta$ should show a decrease with a rise in temperature, indicating little internal heat build-up is occurring in the elastomeric body of article being tested.

The flex fatigue test helps measure the ability of the elastomer to withstand the millions of cycles to which a non-pneumatic tire may be subjected. The test which has been found to correlate favorably with actual test tires is the cut growth resistance as run in accordance with ASTM D-3629-78. Test conditions are: temperature 70° C., atmosphere is air, rate of rotation is 500 rpm and elongation is 29%. The device utilized is the TEXUS Flex tester available from Testing Machines, Inc., New York, Model No. 31-11.

Dynamic measurements to determine a tan $\delta$ value are useful to assure that a suitably low hysteresis value is obtained for the material. Several hysteresis devices are useful including the Rheovibran Tester, Hysterometer, and the Rheometrics Viscoelastic Tester for Solids, Model RVE-S, made by Rheometrics, Inc., New Jersey. These instruments impose a sinusoidal shear strain to the specimen, and analyze the torque responses and phase relation to the strain. The ultimate test of the suitability of an elastomer for use in a high speed tire is its ability to resist heat build-up and degradation at prolonged high speed service.

The following examples are for illustrative purposes only and are not meant to limit the scope of this invention in any manner whatsoever.

Comparative Examples A–G and Examples 1 and 2 of the Invention

The prepolymer of Comparative example A was prepared by reacting 2 moles of toluene diisocyanate with one mole of polytetramethylene ether glycol. Prepolymer of Comparative example B was prepared by reacting 2.4 moles of toluene diisocyanate (TDI) with one mole of polytetramethylene ether glycol, after which the residual free TDI is removed in the manner described in G.B. 1,101,410.

These prepolymers were then reacted with the diamine methylene bis ortho chloroaniline (abbreviated MBOCA) at an isocyanate to active hydrogen ratio of 1.05:1, cured for 16 hours at 212° F. and allowed to equilibrate for 7 days at ambient conditions. Texus flex measurements were then taken. It was found that Texus flex longevity is reduced when the excess free residual TDI is removed. These results are reported in Table 1.

The prepolymers of Comparative examples C, D, E and F were prepared in accordance with the teachings of U.S. Pat. No. 4,934,435 wherein for Example C a molar ratio of 2.15:1 TDI to a polytetramethylene ether glycol (PTMEG) mixture of 85:15 mole ratio 1000:2000 molecular weights.

This prepolymer may also be prepared from a mixture of a toluene diisocyanate polytetramethylene ether glycol 2000 molecular weight prepolymer and a toluene diisocyanate polytetramethylene ether glycol 1000 molecular weight prepolymer on a 85:15 molar ratio.

For examples D through F, an excess amount of TDI was used and the 1000 and 2000 molecular weight polytetramethylene ether glycols are preblended prior to forming the prepolymer with TDI. For example D, an excess amount of TDI was used with a 2.4:1 ratio of the two molecular weight glycols to achieve a 6.2% isocyanate content after the excess TDI was removed.

Example E was prepared using a molar ratio of 2.05:1 TDI to PTMEG of 70:30 650 to 2000 molecular weight. The prepolymer of Example F was prepared using a 2.4 moles of TDI to 1 mole of a PTMEG mixture of 70:30 mole ratio 650 to 2000 molecular weight. The residual free remaining toluene diisocyanate was removed.

These prepolymers were then reacted with MBOCA at an isocyanate to active hydrogen ratio 1.05 and then cured 16 hours at 212° F. They were allowed to equilibrate for seven days at ambient conditions. Texus flex measurements were then taken. Again, it was found in both cases that Texus flex longevity was reduced when free residual toluene diisocyanate levels were reduced.

In Comparative Example G, a ternary blend of polytetramethylene ether glycols of 36:48:15 mole ratio of 650:1000:2000 molecular weight was reacted with 2.05 moles of toluene diisocyanate per mole of mixture.

EXAMPLES 1 AND 2 OF THE INVENTION

In Examples 1 and 2, the prepolymers were prepared using 2.4 moles of toluene diisocyanate per mole of the appropriate ternary blend of polytetramethylene ether glycol. In Example 1 the ratio was 31:62:7 moles of 650:1000:2000 molecular weight polyols. For Example 2 the ratio was 36:57:7 of the 650:1000:2900 molecular weight polyols. The free toluene diisocyanate was then removed.

The prepolymers of Examples G, 1 and 2 were reacted with MBOCA at an isocyanate to active hydrogen ratio of 1.05:1, cured for 16 hours at 212° F., and allowed to equilibrate for seven days at ambient conditions. The TEXUS FLEX measurements were taken as described above and are reported in Table 1.

TABLE 1

| Example # | Molecular Wt | % NCO | Free TDI | Texus Flex Cycles |
| --- | --- | --- | --- | --- |
| A | 1000 | 6.3 | 3.4 | 5M |
| B | 1000 | 6.3 | 0.1 | 2M |
| C | 2000/1000 | 6.3 | 3.4 | 85M |
| D | 2000/1000 | 6.2 | 0.1 | 25M |
| E | 2000/650 | 6.4 | 3.2 | 182M |
| F | 2000/650 | 6.0 | 0.2 | 75M |
| G | 2000/1000/650 | 6.4 | 3.2 | 58M |
| 1 | 2000/1000/650 | 6.0 | 0.2 | 158M |
| 2 | 2900/1000/650 | 6.0 | 0.2 | 182M |

It can be seen from the Table that the ternary molecular weight polyol mixtures of conventional prepolymers, with traditional levels of free TDI, are not improved beyond the prior art as might be expected. Surprisingly, however, low free TDI materials improve dramatically in Texus flex cycles. This result combines the environmental advantages of low free TDI materials with the endurance needed for service life of the end products manufactured from the resins made according to the teachings of this invention.

COMMERCIAL APPLICABILITY

This invention resides in the recognition of the superior performance provided by this specific polyether urethane chemistry. Polyurethane articles of manufacture, made preferably via castable urethane technology, are the intended primary utility of these described prepolymers and cured elastomers. These articles have a body made of the elastomer of this invention and may take the form of any article conventionally made of polyurethane or other elastomers or rubbers such as a belt, hose, air spring, shoe sole, shoe heel, small or large elastomeric-containing wheel assemblies (i.e. skate wheels, industrial tires, automotive-type elastomers and tires. Any article needing improved dynamic flex life (improved flex fatigue resistance) can benefit from the elastomers of this invention.

A preferred end use of this chemistry is a tire which is non-pneumatic in character but which can perform on the highway with durability and vehicle handling characteristics similar to a pneumatic tire. The non-pneumatic tire described in U.S. Pat No. 4,934,425, the disclosure of which is hereby incorporated by reference, would be a most preferred use of the prepolymer and polyurethane elastomer materials of the instant invention. This embodiment encompasses a non-pneumatic tire rotatable about an axis, having improved hysteresis and flex fatigue resistance comprising: an annular body of resilient polyether urethane elastomeric material formed of a first isocyanate end capped low molecular weight polyether polyol having a molecular weight of above about 300 and below 800 and a second intermediate molecular weight isocyanate end capped polyether polyol having a molecular weight above 800 and below 1,500 and a third higher molecular weight isocyanate end capped polyether polyol having a molecular weight between 1,500 and 10,000 cured with an aromatic diamine curative. In a further specialized embodiment the forgoing trimodal prepolymer and elastomer are used to make the annular body of the device of U.S. Pat. No. 4,934,425, which discloses a tire structure having an annular body having a generally cylindrical outer member at the outer periphery thereof, a generally cylindrical inner member spaced radially inward from and coaxial with said outer member, a plurality of axially extending, circumferentially spaced-apart rib members connected at their corresponding inner and outer ends to said inner and outer cylindrical members, said rib members being generally inclined at an angle of about 0° to 75° to radial planes which intersect them at their inner ends, and at least one web member having opposite side faces, said web member having its inner and outer peripheries connected respectively to said inner and outer cylindrical members, said web member being connected on at least one of its side faces to at least one of said rib members to thereby form with said rib member a load-carrying structure for said outer cylindrical member, said load carrying structure being constructed to permit locally loaded members to buckle.

It will be readily apparent to the skilled practitioner in the art that many modifications and changes can be made to the embodiments specifically documented herein. Such modification and changes are a part of the invention if they fall within the scope of the invention defined in the appended claims hereto.

What is claimed is:

1. A process of making a trimodal molecular weight polyether polyol prepolymer having free toluene diisocyanate below 0.5 weight percent comprising the steps of:
    a) reacting toluene diisocyanate with a long chain diol component comprising at least three distinct molecular weight polyether polyols a first low molecular weight polyether glycol having a molecular weight of above about 300 and below 800 and a second intermediate molecular weight polyether glycol having a molecular weight above 800 and below 1,500 and a third higher molecular weight polyether glycol having a molecular weight between 1,500 and 10,000 to form an isocyanate end capped prepolymer; and
    b) removing unreacted toluene diisocyanate from the isocyanate end capped prepolymer to a level of less than 0.5 weight percent toluene diisocyanate.

2. A polyurethane elastomer formed by the reaction of an aromatic diamine curative with a trimodal molecular weight polyether polyol prepolymer having free toluene diisocyanate below 0.5 weight percent and comprising at least three distinct molecular weight polyols, a first low molecular weight polyether polyol having a molecular weight of above about 300 and below 800 and a second intermediate molecular weight polyether polyol having a molecular weight above 800 and below 1,500 and a third higher molecular weight polyether polyol having a molecular weight between 1,500 and 10,000 to form an isocyanate end capped prepolymer.

3. A prepolymer according to claim 1 wherein said polyether polyol is polytetramethylene ether glycol.

4. A prepolymer according to claim 3 wherein the first polytetramethylene ether glycol has a molecular weight of between 400 and 700, the second polytetramethylene ether glycol has a molecular weight between 800 and 1100 and the third polytetramethylene ether glycol has a molecular weight between 2,000 and 4,500.

5. A polyurethane elastomer according to claim 2 wherein the polyether urethane elastomer has a molar equivalence ratio range of the first, second, and third isocyanate end capped glycol to aromatic diamine curative of about 80 to about 115.

6. A polyurethane elastomer according to claim 2 wherein the ratio of NCO to OH in said prepolymer is in the range of about 2.0:1.0 to 2.6:1.0.

7. A polyurethane elastomer according to claim 2 wherein the aromatic diamine curative is 4,4'-methylene bis(2-chloroaniline).

8. A process of making a trimodal molecular weight polyether polyol prepolymer having free toluene diisocyanate below 0.5 weight percent comprising the steps of:
    (a) blending a first, a second and a third toluene diisocyanate endcapped polyol prepolymer, each of said prepolymers having a free toluene diisocyanate level of greater than 0.5 weight percent, said first toluene diisocyanate endcapped polyol prepolymer being the reaction product of toluene diisocyanate and a first low molecular weight polyether polyol having a molecular weight of above about 300 and below 800, said second toluene diisocyanate endcapped polyol prepolymer being the reaction product of toluene diisocyanate and a second intermediate molecular weight polyether polyol having a molecular weight above 800 and below 1,500, said third toluene diisocyanate endcapped polyol prepolymer being the reaction product of toluene diisocyanate and a third higher molecular weight polyether polyol having a molecular weight between 1,500 and 10,000 to form a prepolymer blend; and
    b) removing unreacted toluene diisocyanate from the prepolymer blend to a level of less than 0.5 weight percent toluene diisocyanate.

9. A process of making a trimodal molecular weight polyether polyol prepolymer having free toluene diisocyanate below 0.5 weight percent comprising the steps of:

(a) producing a first toluene diisocyanate endcapped polyol prepolymer as the reaction product of toluene diisocyanate and a first low molecular weight polyether polyol having a molecular weight of above about 300 and below 800;

(b) producing a second toluene diisocyanate endcapped polyol prepolymer as the reaction product of toluene diisocyanate a second intermediate molecular weight polyether polyol having a molecular weight above 800 and below 1,500;

(c) producing a third toluene diisocyanate endcapped polyol prepolymer as the reaction product of toluene diisocyanate a third higher molecular weight polyether polyol having a molecular weight between 1,500 and 10,000;

(d) removing unreacted toluene diisocyanate to a level of less than 0.5 weight percent toluene diisocyanate in each of said first, said second and said third toluene diisocyanate endcapped polyol prepolymer; and (e) blending said first, said second and said third toluene diisocyanate endcapped polyol prepolymer, each of said prepolymers having a free toluene diisocyanate level of less than 0.5 weight percent to make said trimodal molecular weight polyether polyol prepolymer.

10. An elastomeric article having improved flex fatigue resistance comprising: an body of polyurethane elastomer formed by the reaction of an aromatic diamine curative with a trimodal molecular weight polyether polyol prepolymer having free toluene diisocyanate below 0.5 weight percent and comprising at least three distinct molecular weight polyols, a first low molecular weight polyether polyol having a molecular weight of above about 300 and below 800 and a second intermediate molecular weight polyether polyol having a molecular weight above 800 and below 1,500 and a third higher molecular weight polyether polyol having a molecular weight between 1,500 and 10,000 to form an isocyanate end capped prepolymer.

* * * * *